United States Patent [19]
Christensen

[11] Patent Number: 5,435,869
[45] Date of Patent: Jul. 25, 1995

[54] METHOD FOR MANUFACTURING A COMPOSITE CRANK ARM

[76] Inventor: Roland Christensen, 192 E. 1st North, Fayette, Utah 84630

[21] Appl. No.: 113,714

[22] Filed: Aug. 27, 1993

[51] Int. Cl.⁶ .......................................... B65H 81/00
[52] U.S. Cl. .................................. 156/175; 156/169; 156/173; 156/242; 156/245; 264/258; 74/594.1
[58] Field of Search ............... 156/169, 173, 175, 425, 156/245, 242; 264/258, 257; 74/594.1, 594.2, 594.3

[56] References Cited

U.S. PATENT DOCUMENTS

| | | | |
|---|---|---|---|
| 3,645,833 | 2/1972 | Figge | 156/169 X |
| 4,137,354 | 1/1979 | Mayes, Jr. et al. | 156/175 X |
| 4,376,669 | 3/1983 | Math | 156/161 |
| 4,671,336 | 6/1987 | Anahara et al. | 264/258 X |
| 4,811,626 | 3/1989 | Bezin | 74/594.1 |
| 4,894,108 | 1/1990 | Richard et al. | 264/258 X |
| 5,215,616 | 6/1993 | Fillar | 156/175 X |

FOREIGN PATENT DOCUMENTS

| | | | |
|---|---|---|---|
| 3902272 | 8/1990 | Germany | 74/594.1 |
| 61-43541 | 3/1986 | Japan | 264/258 |

OTHER PUBLICATIONS

Portion of Article Entitled "Two Wheeler Evolution" by Steven Levin, et. al., *Advanced Composites*, Jan./Feb. 1993, p. 40.

*Primary Examiner*—Jeff H. Aftergut
*Attorney, Agent, or Firm*—Thorpe, North & Western

[57] ABSTRACT

A method for manufacturing a filament wound composite crank arm includes forming unidirectional filament wound first and second elongated rings and a first reinforcement disk having a center hole. A second reinforcement disk having a threaded center hole is made of steel. The first ring is placed in the bottom of a hollow, heated mold. The inserts are placed onto mandrels within the mold so that they reside within the first ring. Resin-impregnated fiber filler is placed into the mold. A strand of resin-impregnated fiber is wound around a special plunger to form a torsion-resistant member comprising an elongate truss framework integrally interposed between two opposing walls of an elongated cylindroid. The second ring is positioned around the torsion-resistant member at one of its edges, and the torsion-resistant member is placed into the mold to become circumscribed by the first ring at its other edge and to surround the inserts. The crank arm is completed by applying pressure to the plunger to cause the resin-fiber filler to fill the remaining void spaces within the mold and thereby bond together all of the components. The crank arm includes two receiving cavities which pass through the holes of the two inserts, for interchangeably connecting the crank arm to other components, the inserts for reinforcing said connections.

13 Claims, 2 Drawing Sheets

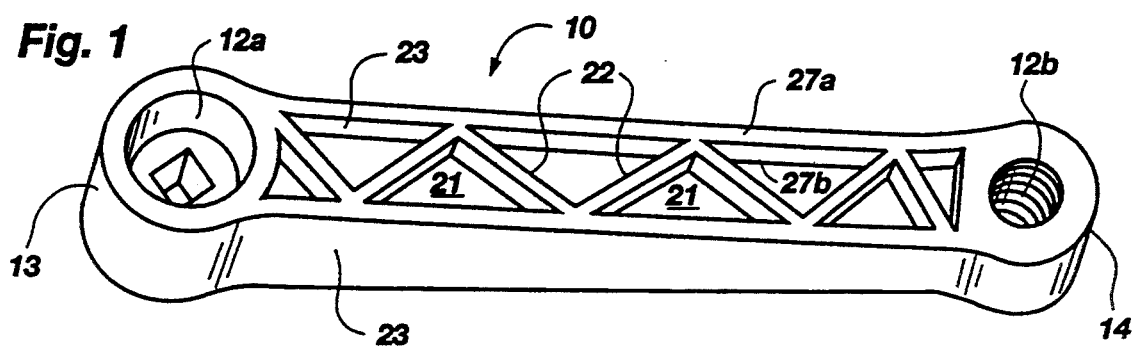
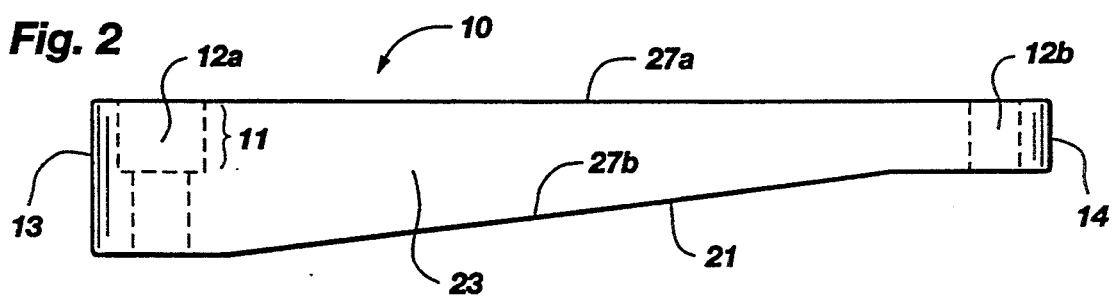
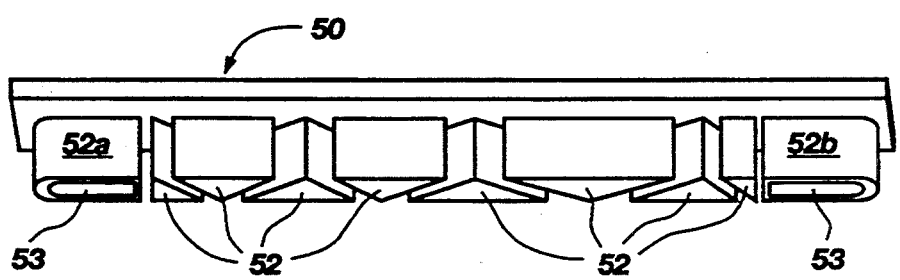
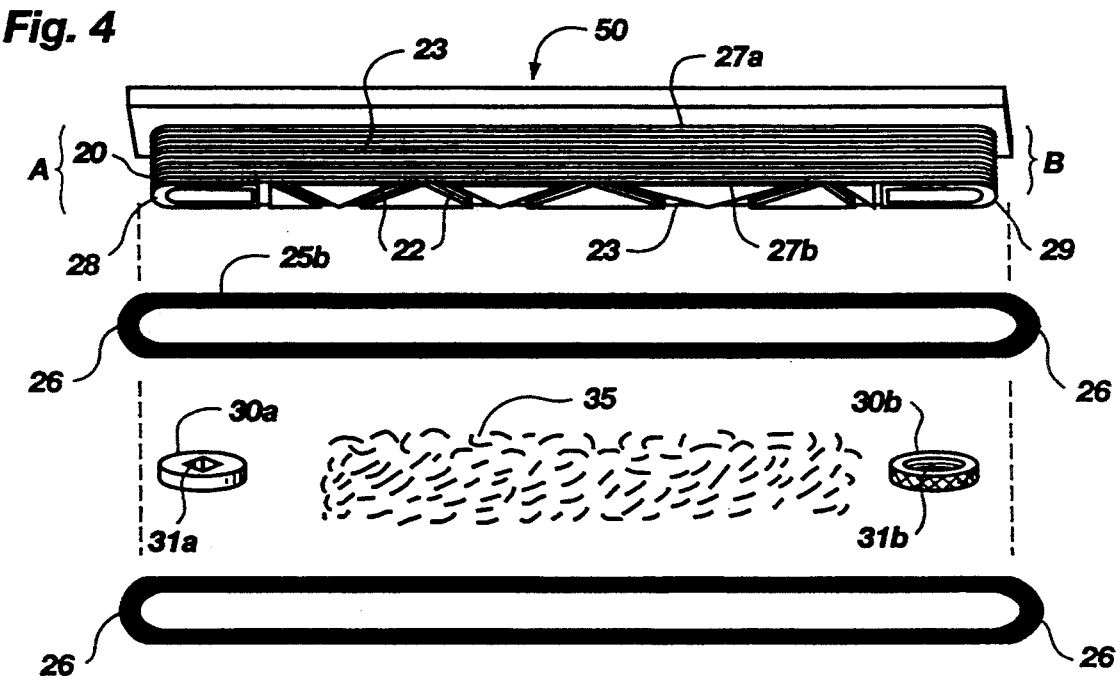

METHOD FOR MANUFACTURING A COMPOSITE CRANK ARM

BACKGROUND OF THE INVENTION

1. The Field of the Invention

The present invention relates generally to crank arms. More particularly, it concerns a method of manufacturing a bicycle crank arm which is sturdy, lightweight and interchangeable, for structurally linking a bicycle sprocket and a foot pedal.

2. The Background Art and Background of the Invention

The bicycle industry is a multi-million dollar industry which relies heavily on interchangeable parts to make bicycles easier to repair and thus more affordable for the average consumer. Bicycles are generally used for commuting, recreation and sport. Bicycling has become quite popular, in part because it is a means of travel which is environmentally clean and physically challenging. Of current interest are apparatus and methods of making interchangeable bicycle parts which are relatively lightweight and have a modern appearance but which also possess the necessary strength.

A bicycle is generally a vehicle having a structural steel frame, two wheels in tandem, pedals connected to a sprocket, a continuous circular chain connecting the rear wheel and the sprocket, handlebars for steering, and a saddlelike seat. A user sits on the seat and pumps the pedals to power the sprocket and hence the chain, thereby manually actuating the rear wheel and causing it to frictionally engage the ground and thus propel the bicycle. Bicycle routes include various types of terrain and conditions: asphalt streets, dirt roads, sports tracks, foothills and even mountain trails, all in conditions ranging from extreme summer heat to cold winter conditions. Bicycles must therefore not only be light enough for a user to propel with his or her own strength, they must also be strong enough to absorb the repeated impact forces imposed by unpredictable terrain, and durable enough to withstand seasonal weathering and extreme temperature change.

The bicycle frame has been the main focus of industry efforts to optimize the weight to strength ratio of the bicycle. Prior to the turn of the century, bicycle frames were made of solid steel and were called "bonebreakers" because they were so heavy and difficult to maneuver. Today, however, bicycle frames are much lighter and typically comprise integrally connected tubular steel members. Various structural designs have been developed for making bicycle frames which are lighter than their solid steel ancestors but which are strong enough to withstand the customary impact forces during use. Although there are many materials which are lighter than structural metal, the industry continues to make bicycle frames from structural steel and other metal alloys to ensure sufficient impact strength, durability and weatherability.

However, the frame is not the only focus of industry efforts to reduce the overall weight of the bicycle. For example, today's bicycle tires and inner tubes are narrower and lighter than their predecessors. Bicycle seats are smaller and lighter. The industry continually tries to optimize the weight to strength ratio of bicycles by redesigning not just the frame, but the smaller components as well. Designers also strive to develop bicycles which have a uniquely modern look by altering the configuration and structural arrangement of the frame as well as the shape, color and texture of the component bicycle parts.

Bicycle crank arms, the structural members which link the foot pedals to the sprocket, are made of solid steel or other metals even today. The bicycle crank arm is unique because it must withstand simultaneous direct applications of bending and torsional loads introduced by the foot pedal which is attached at a proximal end thereof. Moreover, for a mechanical member such as a crank arm to be interchangeable, it must comprise a material which is stiff and strong enough to avoid undue deformation or stripping at its connecting points with other mechanical members. The bicycle crank arm must also be durable enough to withstand the indirect effects of impact forces which pass through the frame.

The conventional approach to constructing bicycle crank arms typically involves the use of structural steel, aluminum, or metal alloys involving steel, titanium, magnesium and other metals. Structural steel has been used over other traditional construction materials for its hardness and superior bending and torsional strength, durability, and thermal capacity which allows it to withstand the seasonal temperature changes encountered by both summer and winter cycling. The industry continues to research and develop metal alloys in order to minimize density while maintaining strength, durability and thermal capacity to tolerate temperature change. Steel and metal alloys are therefore used in fabricating interchangeable crank arms and other structural members which must withstand bending, torsion, weathering and other wear.

Previously available bicycle crank arms thus include a single, solid metal integral member which has for decades met the needs of hardness, bending and torsion imposed during bicycle use. However, the previously available bicycle crank arms have many disadvantages. They are heavy and offer limited opportunity for the design of a modern appearance. Moreover, they rely on a single integral member to withstand both torsion and bending, which is a less efficient mechanical use of materials. Crank arms made of metal require a long time to manufacture. These and other problems, when recognized, represent needs which have been unmet in the industry until the advent of the present invention, to the knowledge of the inventor.

There is thus a need to achieve a lighter, modern looking bicycle crank arm which is still strong enough to withstand simultaneous bending and torsional loads, and durable enough to withstand the indirect effects of impact forces. There is also a need for a crank arm that is not limited to a single structural component for withstanding both bending and torsional loads, and the resulting mechanical stress and strain. Those having ordinary skill in the art will appreciate that these and other needs are met by the present invention.

The disadvantages of the prior art are overcome in the present invention by provision of a composite crank arm and a method of making the same. Composite materials have a number of advantages over traditional materials such as steel. As is generally known in the art, a composite material is any material which is manufactured using two or more components having different molecular and physical properties. For example, a common composite object such as a rowing paddle or a snow ski consists of glass fibers (reinforcement) bound together in a plastic material (matrix) such as polyester resin. Both the reinforcement and the matrix have specific functions which contribute desirable attributes to the composite part. The reinforcement carries the loads imposed on the part while the matrix protects and stablizes the reinforcement and holds the shape of the part, thereby channeling the load direction and providing for more efficient load transfer through the reinforcement fibers. The strength of a composite part thus depends on its ability to transfer the load onto the reinforcement component.

The materials which comprise the reinforcement and matrix components of a composite part generally include metals, ceramics, and plastics. Prior art composite parts have been used in many areas, including aerospace and aircraft applications, artificial limbs, marine structures, sports equipment and automotive parts.

The reinforcement component of a composite material can be in the form of a single piece of fabric which may utilize one of many possible weaves and weave angles. However, the reinforcement can also be in the form of a bundle of unidirectional strands of industrial roving material. Embodiments of the present invention can incorporate one or both of these forms of composite reinforcement.

Many different matrix materials can be used to fabricate embodiments of the present invention, including polyester, vinylester, epoxy and phenolic. Moreover, many different reinforcement materials can be used in the present invention, including fiberglass, graphite and KEVLAR TM. Those skilled in the pertinent art will understand the use of these and other suitable materials.

OBJECTS AND SUMMARY OF THE INVENTION

It is therefore an object of the present invention to provide a composite crank arm.

It is an additional object of the invention to provide such a crank arm which is relatively strong, lightweight, durable and weather-resistant.

It is another object of the invention to provide such a crank arm which is simple and can be manufactured quickly.

It is also an object of the invention to provide such a crank arm which can be designed to have a modern aesthetic appearance.

It is a further object of the invention to provide such a crank arm which is interchangeable.

While the present invention is described in terms of a crank arm to be used in bicycles, it is to be understood that the subject crank arm and method may be used for any crank arm involved in any mechanical field or application. Those having ordinary skill in the field of this invention will appreciate the advantages of the invention, and its application to a wide variety of uses.

The above objects and others not specifically recited are realized in a specific illustrative embodiment of a filament wound composite crank arm, and a method of manufacturing the same. The crank arm includes a filament wound, torsion-resistant member comprising an elongate truss framework interposed between two opposing walls of a cylindroid elongated along its major axis and having distal and proximal curvilinear extremities. First and second filament wound, bending-resistant rings snugly circumscribe the cylindroid at its upper and lower edges, each ring having substantially the same shape as the cross section of the cylindroid. Two reinforcement insert disks having holes in their centers are disposed within the cylindroid, one each at said distal and proximal extremities. Filler material comprising chopped fiber filament impregnated with epoxy resin encapsulates and bonds together this configuration of elements.

The crank arm is made by forming the first and second rings and one of the reinforcement disks each from an unidirectional strand of resin-impregnated filament. The other reinforcement disk is made of steel, and the center hole is a female threaded one. The first ring is placed in the bottom of a hollow, heated mold. The inserts are placed onto mandrels within the mold so that they reside within the first ring. The resin-fiber filler is placed into the mold. The second ring is placed to circumscribe the torsion-resistant member at one of its edges. The torsion-resistant member is placed into the mold and within the first ring such that the first and second rings circumscribe said torsion-resistant member, one at the upper edge and the other at the lower edge, with said torsion-resistant member surrounding the inserts. The crank arm is completed by applying pressure and heat to the mold to thereby cause the resin-fiber filler to fill the remaining void spaces within the mold and thereby bond together the inserts, rings and torsion-resistant member. The crank arm includes two slots which pass through the holes of the two inserts, for interchangeably connecting the crank arm to other components, the inserts for reinforcing said connections.

BRIEF DESCRIPTION OF THE DRAWINGS

The above and other objects, features and advantages of the invention will become apparent from a consideration of the subsequent detailed description presented in connection with the accompanying drawings in which:

FIG. 1 is a perspective view of a bicycle crank arm made in accordance with the principles of the present invention;

FIG. 2 is a side view of the bicycle crank arm of FIG. 1, with portions thereof shown in phantom;

FIG. 3 is a perspective view of a special plunger used in manufacturing the bicycle crank arm of FIG. 1;

FIG. 4 is an exploded perspective view of the bicycle crank arm of FIGS. 1-2;

Figure 5:
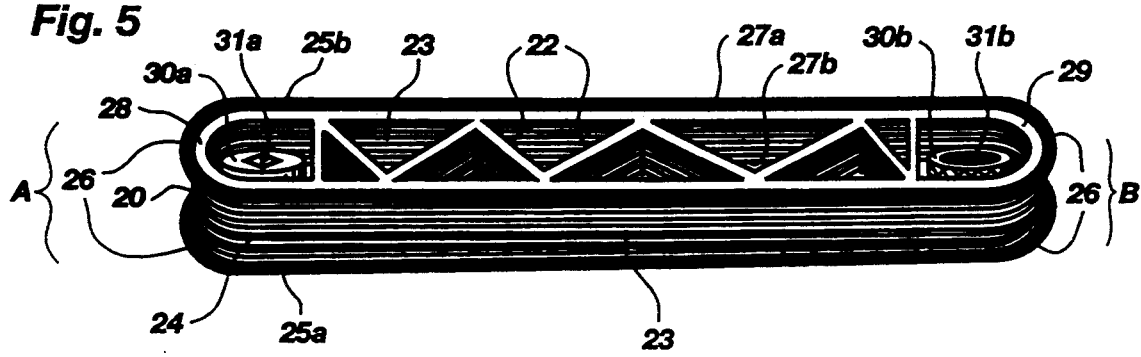
FIG. 5 is a perspective view of some of the components of the bicycle crank arm of FIG. 1.

DETAILED DESCRIPTION OF THE PRESENTLY PREFERRED EMBODIMENTS OF THE PRESENT INVENTION

Reference will now be made to the drawings wherein like structures will be provided with like reference numerals.

Referring to FIGS. 1-2, there is shown a bicycle crank arm, generally designated at 10, for structurally connecting a foot pedal and a bicycle sprocket. The crank arm 10 includes distal and proximal extremities 13 and 14, respectively. The separate components of the crank arm 10 are shown in FIGS. 4-5. The crank arm 10 comprises a core member 20, first and second support rings 25a and 25b, respectively, first and second reinforcement inserts 30a and 30b, respectively, a planar wall 21 and chopped resin-fiber filler 35.

The first and second support rings 25a and 25b, the first reinforcement insert 30a and the core member 20 comprise resin-impregnated unidirectional strands of high-strength fiber filament roving. These members may alternatively comprise any other load-bearing material. For example, the first reinforcement insert 30a can also be made of steel. The second reinforcement insert 30b is preferably made of steel, but may also be made of composite or any material suitable for reinforcing structural connections. The resin-fiber filler 35 comprises chopped fiberglass strands impregnated with a commercially available epoxy resin. The strands may also comprise conventional graphite, KEVLAR ™ and other reinforcement fiber as is known in the art. All composite components of the present invention are preferably made of the same fiber and resin.

A preferred method of manufacturing the crank arm 10 of FIGS. 1-2 is as follows. Each of the first and second support rings 25a and 25b is formed by winding a continuous strand of resin-impregnated fiber roving about four times around a mandrel, the windings being closely spaced to form a circular bundle of unidirectional fiber. The support rings 25a and 25b preferably have the shape of an ellipse elongated along its major axis and thus have two opposing sides and two opposing curvilinear extremities 26. More windings or fewer windings may be used, and the members 25a and 25b may comprise any other shape suitable to a user. After forming, the support rings 25a and 25b are removed from the mandrels. These members 25a and 25b are support rings which may alternatively comprise a single ring or more than two rings.

Referring to FIGS. 4-5, the first reinforcement insert 30a is preformed by winding the resin-impregnated fiber about a mandrel preferably having a square cross sectional shape, such that said insert 30a has a square hole 31a in the center thereof. After curing, the insert 30a is removed from the mandrel. The second reinforcement insert 30b is cast or machined from steel in any manner known in the art, so that it includes a threaded center hole 31b.

The core member 20 is formed by winding resin-impregnated fiber many times about a special plunger 50 shown in FIG. 3. The plunger comprises a plurality of spatially separate projecting members 52 which permit criss-cross winding patterns to thereby enable a filament wound composite member having a truss framework 22 integrally interposed between two opposing walls 23 of a cylindroid 24 elongated along its major axis. The term "criss-cross pattern" as used herein refers to any winding pattern for filament roving which results in a core member 20 having support structure interposed between the opposing walls of an elongated cylindroid, with separating voids between the support structure. FIGS. 4 and 5 are thus examples of one embodiment of such a core member 20, wherein the support structure is the truss framework 22.

Projecting members 52a and 52b of the plunger 50 comprise apertures 53 for receiving the reinforcement inserts 30a and 30b. The core member 20 comprises upper and lower edges 27a and 27b, and distal and proximal curvilinear extremities 28 and 29. The distal extremity 28 preferably has a greater height designated at bracket A, than the height of the proximal extremity 29, designated at bracket B. However, these relative heights may vary according to the needs of a user. The core member 20 may alternatively be formed with any other method or material which yields a plurality of support walls interposed between the opposing walls of an elongated cylindroid. For example, the core member 20 may be formed by compression molding chopped resin-impregnated fiber, or any other lay-up procedure, instead of filament winding. In addition, the support structure of the core member 20 need not comprise the truss framework 22, but may alternatively comprise any configuration of support walls, rods, bars or other members.

Referring generally to FIG. 4, the first elongate ring 25a is placed into the bottom of a heated, hollow mold (not shown) and surrounds two mandrels (not shown), each mandrel being located near one of the curvilinear extremities of the ring 25a. The mold is preferably heated to about 250° Fahrenheit but other temperatures may, of course, be used. The first and second inserts 30a and 30b are placed onto the mandrels and into the bottom of the mold so that they reside within the ring 25a near said curvilinear extremities 26. The resin-fiber filler 35 is placed in the mold and spread around therein.

The second ring 25b is placed about the core member 20, which is still on the plunger, so that said ring 25b circumscribes said core member 20 approximately at the upper edge 27a thereof to be concentric with said core member. The plunger is then placed into the mold so that the core member 20 resides within the first ring 25a. Said first and second rings 25a and 25b circumscribe the core member 20 preferably at its lower and upper edges 27b and 27a, respectively, and said core member 20 surrounds the first and second inserts 30a and 30b which reside within the apertures 53 of the mold 50.

The second ring 25b may alternatively be formed as it is placed about the core member 20, simply by winding a continuous strand of resin-impregnated fiber directly about the walls 23 of the cylindroid 24. As discussed above, the support rings may comprise a single ring or a plurality of rings, and they may be either preformed or formed by winding uncured, resin-impregnated fiber roving directly about the core member 20.

The support rings 25a and 25b preferably circumscribe the core member 20 at its upper and lower edges 27a and 27b in order to provide maximum resistence against bending, and to reinforce the edges of the resulting crank arm 10.

At this point all of the separate component parts of the crank arm 10 have been placed within the mold such that they are correspondingly fitted with each other. The relative positioning of the parts without the mold is shown in FIG. 5. The resin-fiber filler 35 surrounds these parts within the mold, but is not shown in FIG. 5. The heat supplied to the mold causes the resin-fiber filler 35 to become sufficiently pliable and tacky to permit the parts to become bonded together.

The crank arm 10 is completed by applying pressure to the plunger. During this time the resin-impregnated roving of the crank arm 10 is allowed to cure and the pressure applied to the plunger causes the resin-fiber filler 35 to fill any void spaces within the mold and thereby form planar wall 21 and bond together the inserts 30a and 30b, rings 25a and 25b and core member 20. After curing, the completed crank arm 10 is removed from the mold and appears as shown in FIGS. 1-2.

It is to be understood that the relative positioning of the separate components of the crank arm 10 may vary somewhat. For example, the second support ring 25b may end up somewhat below the upper edge 27a of the core member 20. It is also to be understood that the order in which each separate component is placed into the mold may vary. For example, the inserts 30a and 30b may be placed into the mold after the core member 20 instead of before, and so forth. What is important is that the support rings 25a and 25b surround the core member 20, and that said core member 20 surrounds the inserts 30a and 30b, as in FIG. 5, all of which are bonded together under pressure with the resin-fiber filler 35.

The crank arm 10 comprises attachment means in the form of first and second receiving cavities 12a and 12b as shown in FIGS. 1-2, said cavities for interchangeably fastening the crank arm 10 to a bicycle sprocket and a foot pedal, respectively. The receiving cativies 12a and 12b are formed by the relative positioning of the mold, mandrels and plunger, and pass through the center holes 31a and 31b of the reinforcement inserts 30a and 30b. The first receiving cavity 12a preferably comprises first insert 30a countersunk within the distal extremity 28 of the core member 20 as shown by countersunk space at bracket 11 in FIG. 2. The second receiving cavity 12b preferably retains the threads of the insert 30b and preferably has a height substantially equivalent to the height the proximal extremity 29 of the core member 20, bracket B. However, the receiving cavities 12a and 12b may also include any shape or position suitable to a user. The reinforcement inserts 30a and 30b may of course comprise any material suitable for reinforcing the receiving cavities 12a and 12b. Instead of the receiving cavities 12a and 12b, the attachment means may comprise any other means or structure suitable for attaching the crank arm 10 to other components.

Figure 6:
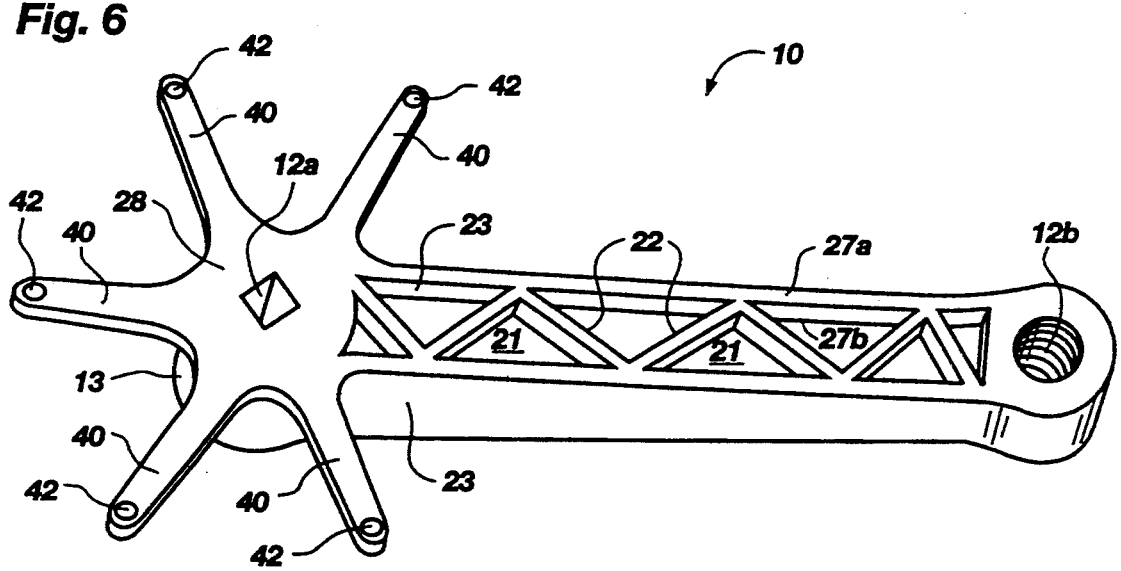
FIG. 6 is a perspective view of an alternative embodiment of the bicycle crank arm of FIG. 1.

An alternative embodiment of the crank arm 10 is illustrated in FIG. 6, which can be manufactured using substantially the same method described above. The main distinction in this embodiment is that fastening fingers 40 having apertures 42 extend outward from the distal extremity 28. The fingers 40 are for fastening to a bicycle sprocket in addition to fastening the first receiving cavity 12a thereto, and thus provide additional reinforcement to the connection between the crank arm 10 and a bicycle sprocket. The fastening fingers 40 are connected to the distal extremity 13 of the crank arm 10 and are formed by compression molding chopped resin-riber filler. Thus, the embodiment of FIG. 6 requires a mold having additional void spaces corresponding to the fastening fingers 40.

Figure 7:
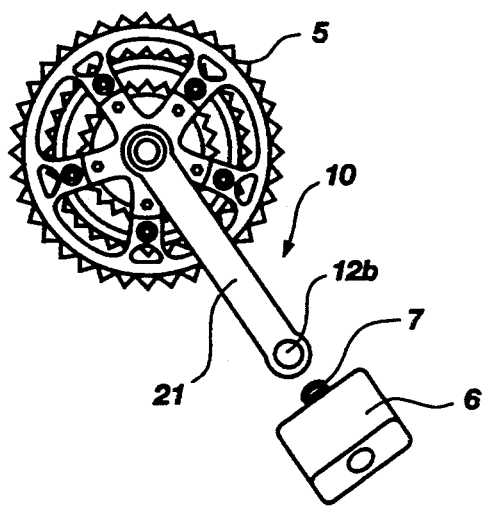
FIG. 7 is a side view of the bicycle crank arm of FIG. 1 mounted upon a bicycle sprocket.
Figure 8:
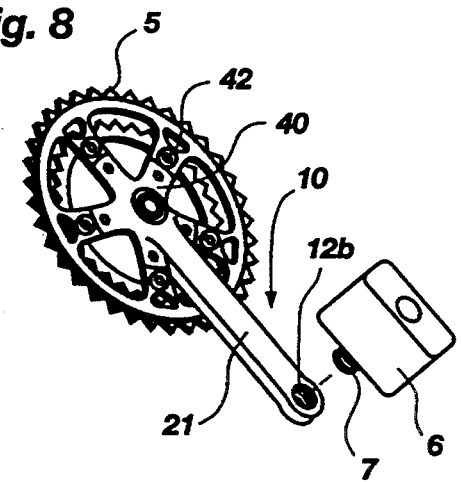
FIG. 8 is a perspective view of the bicycle crank arm of FIG. 6 mounted upon a bicycle sprocket.

In use, the crank arm 10 is connected to a bicycle sprocket 5 by the first receiving cavity 12a as shown in FIGS. 7-8. A foot pedal 6 having an arm 7 is attached to the crank arm 10 by rotatably securing the arm 7 within the second receiving cavity 12b as shown, in any manner known in the art. It is to be understood that the crank arm 10 can be fabricated and installed such that the planar wall 21 faces away from the sprocket 5 as in FIGS. 7-8, or, in the alternative, such that the truss framework 22 faces away from the sprocket 5, according to the aesthetic tastes of the manufacturer or customer. As a user rides the bicycle by pumping the pedals 6, both torsion and bending loads are placed onto the crank arms 10 which are resisted by the core member 20 and the support rings 25a and 25b, respectively.

The present invention represents a significant advance over traditional apparatus and methods of manufacturing crank arms. It is noted that many of the advantages of the present invention accrue due to the use of composite materials and the concentric relationship between the torsion-resistant member 20 and the support rings 25a and 25b held in place by the fiber-resing filler 35. The present invention offers the advantages of lighter weight, more strength and modern looks when compared with the prior art. Although the present invention is introduced as a bicycle crank arm, its scope is much broader than that and can be used to manufacture crank arms for machinery or any other application requiring torsional strength, bending strength or both. Those skilled in the art will appreciate from the preceding disclosure that the objectives stated above are advantageously achieved by the present invention.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A method of manufacturing a crank arm comprising the steps of:
   a) forming:
      (i) two opposing walls of a cylindroid elongated along its major axis, and
      (ii) support structure interposed between the opposing walls of the cylindroid with separating voids between the support structure,
   to thereby form a core member;
   b) providing at least one support ring;
   c) placing the support ring about the core member such that said ring circumscribes said core member and is concentric therewith;
   d) inserting resin-impregnated fiber filler material into a hollow mold;
   e) placing the core member circumscribed by the support ring into the mold;
   f) supplying heat to the mold to a predetermined temperature;
   g) applying pressure to the mold so that the resin is cured under pressure to thereby form the crank arm; and
   h) removing the crank arm from the mold.

2. A method according to claim 1, wherein the crank arm is a bicycle crank arm for structurally connecting a foot pedal and a bicycle sprocket, step (a) further comprising the following step:
   (i) forming an elongate truss framework integrally interposed between two opposing walls of a cylindroid elongated along its major axis by winding resin-impregnated filament roving a plurality of times in a criss-cross pattern.

3. A method according to claim 2 wherein step (b) further comprises the following step:
   j) winding resin-impregnated filament roving to thereby form first and second support rings.

4. A method according to claim 3 wherein the core member includes upper and lower edges, step (c) further comprising the following step:
   k) placing said first and second support rings about the core member such that they circumscribe said core member at the lower and upper edges thereof, respectively.

5. A method according to claim 2 wherein steps (b) and (c) are incorporated into the following step:
   l) winding a continuous strand of resin-impregnated fiber roving directly about the core member to thereby form at least one support ring such that said support ring circumscribes said core member and is concentric therewith.

6. A method according to claim 2 wherein the crank arm includes distal and proximal extremities, the method further comprising the following step:
   m) forming attachment means in the distal and proximal extremities of the crank arm for attachment to a sprocket and a foot pedal of the bicycle, respectively.

7. A method according to claim 6 wherein step (m) further comprises the following step:
   n) forming a hole in the distal and proximal extremities of the crank arm.

8. A method according to claim 7 wherein step (n) further comprises the following step:
   o) disposing first and second reinforcement inserts within the distal and proximal extremities of the crank arm, respectively, to thereby reinforce said holes in said distal and proximal extremities.

9. A method according to claim 2 wherein the crank arm includes distal and proximal extremities, the method further comprising the following step:
   p) forming at least one fastening finger to extend outward from the distal extremity of the crank arm, said fastening finger for fastening to the sprocket.

10. A method of manufacturing a composite crank arm comprising the steps of:
   a) inserting resin-impregnated fiber filler material into a hollow mold such that said filler assumes the shape of support walls integrally interposed between two opposing walls of a cylindroid elongated along its major axis;
   b) supplying heat to the mold to a predetermined temperature;
   c) applying pressure to the mold to thereby compress the filler, eliminate any void spaces within said filler and thus form the crank arm;
   d) allowing the resin to cure; and
   e) removing the crank arm from the mold.

11. A method of manufacturing a filament wound composite crank arm comprising the steps of:
   a) selecting a plunger element having multiple projecting members separated by channels;
   b) forming support structure interposed between two opposing walls of a cylindroid with separating voids between the support structure, to thereby form a core member, by placing resin-impregnated filament roving around the projecting members of the plunger and within the separating channels;
   c) providing at least one support ring;
   d) placing the support ring about the core member such that said ring circumscribes said core member and is concentric therewith;
   e) inserting resin-impregnated fiber filler material into a hollow mold;
   f) placing the core member circumscribed by the support ring into the mold;
   g) supplying heat to the mold to a predetermined temperature;
   h) applying pressure to the mold so that the resin is cured under pressure to thereby form the crank arm; and
   i) removing the crank arm from the mold.

12. A method according to claim 11, wherein step (b) further comprises the following step:
   j) winding resin-impregnated filament roving around the projecting members of the plunger element.

13. A method according to claim 12 wherein step (c) further comprises forming first and second filament wound support rings, and step (f) further comprises the following steps:
   k) selecting first and second reinforcement inserts, each insert having a hole therein;
   l) placing said first and second reinforcement inserts onto mandrels within the mold; and
   m) placing the plunger into the mold such that the core member surrounds the first and second inserts.

* * * * *